UNITED STATES PATENT OFFICE.

JUDSON A. DE CEW, OF MONTREAL, QUEBEC, CANADA.

NON-CORROSIVE COMPOUND FOR REFRIGERATOR-CARS AND THE LIKE.

1,141,446.      Specification of Letters Patent.      Patented June 1, 1915.

No Drawing. Application filed November 4, 1910, Serial No. 590,740. Renewed April 27, 1915. Serial No. 24,352.

*To all whom it may concern:*

Be it known that I, JUDSON A. DE CEW, of the city of Montreal, in the Province of Quebec and Dominion of Canada, have invented certain new and useful Improvements in Non-Corrosive Compounds for Refrigerator-Cars and the like, of which the following is a full, clear, and exact description.

This invention relates to a non-corrosive mixture which is particularly adapted for use in connection with the icing of refrigerator cars and the like.

In the ordinary method of icing refrigerator cars, it is customary to use about ten to fifteen per cent. of common or rock salt with the ice, in order to lower the temperature of the latter. When the salt dissolves and drops upon the metal under frame of the car, or the rails and steel parts of bridges, corrosion of the metal occurs, and frequently serious damage results from this cause.

I have discovered, after careful examination, that the cause of this corrosion is due largely to impurities and other matters in the salt, and particularly to the presence of calcium or magnesium chlorids. The chemical reactions that take place when salt, containing these chlorids, comes in contact with iron and steel are very rapid, and the main object of this invention is to provide a mixture or compound which may be used with the salt to prevent corrosion of the iron or steel members.

I have discovered that corrosion may be entirely prevented by the use of certain alkalis with the salt, these alkalis serving to prevent the formation of hydrochloric acid, due to the decomposition of each chlorids. The alkalis that can be used for this purpose are preferably sodium silicate, soda ash ($Na_2CO_3$) and caustic soda (NaOH). I have found that, for the purpose of icing cars, the most suitable material is soda ash, or a strongly alkaline silicate of soda which contains a large excess of alkali. These alkalis are preferably mixed with the salt in a proportion of about five to ten per cent. of the latter, and the reaction taking place results in the formation of calcium carbonates or silicates, with sodium chlorid, the latter of which is found to be practically harmless in its pure condition.

In addition to preventing the corrosive action of earth chlorids or other decomposible salt impurities, a strongly alkaline silicate of soda, from its physical property of expelling water rather than absorbing it, has a tendency to rapid drying which is of great service. For instance, if a solution of salt (NaCl) containing calcium chlorid (CaCl) should fall upon the steel surface of a bridge structure, the hygroscopic character of the mixture will cause it to retain moisture for a great length of time, and give it those conditions of solution which make it most strongly corrosive. But if a salt (NaCl) containing some soluble silicate of soda should fall upon the same surface, there would be no chemical action toward corrosion from the salt itself, and the solution would dry so rapidly that the conditions for corrosion would also disappear.

Instead of mixing the above alkalis with salt, the materials may be applied separately, the only requirement being that the products are mixed before being discharged from the car.

The alkalis of potash as well as soda may also be used, being the hydrates, carbonates or silicates of these bases.

Having thus described my invention, what I claim is:—

A composition for use with ice in icing cars consisting of salt mixed with approximately 5% alkali.

In witness whereof I have hereunto set my hand in the presence of two witnesses.

JUDSON A. DE CEW.

Witnesses:
     C. W. TAYLOR,
     E. R. McKENZIE.